United States Patent [19]
Bodin

[11] 3,992,882
[45] Nov. 23, 1976

[54] HYDRAULIC CIRCUIT

[76] Inventor: Ove Bodin, Box 54, 710 10 Fjugesta, Sweden

[22] Filed: June 4, 1975

[21] Appl. No.: 583,570

[30] Foreign Application Priority Data
June 5, 1974 Sweden .............................. 7407386

[52] U.S. Cl. .................................. 60/413; 60/418
[51] Int. Cl.$^2$ ......................................... F15B 1/02
[58] Field of Search ...................... 60/413, 418, 423

[56] References Cited
UNITED STATES PATENTS

| | | | |
|---|---|---|---|
| 2,623,358 | 12/1952 | Greer | 60/416 |
| 2,674,092 | 4/1954 | Gardiner | 60/418 |
| 2,968,927 | 1/1961 | Quayle | 60/371 |

Primary Examiner—Edgar W. Geoghegan
Attorney, Agent, or Firm—Burns, Doane, Swecker & Mathis

[57] ABSTRACT

In a hydraulic circuit used in an electrically operated vehicle having hydraulically operated steering apparatus and a hydraulically operated working device, such as a lifting fork for example, the same pump means supplies working medium to both the steering apparatus and the working device. Arranged in the system of pipes serving the steering apparatus is a device for detecting the pressure in the pipe system. The device is adapted to co-act with the pump means in such a way that when a low pressure value prevails in the system the pump means is activated and is de-activated when a high pressure prevails in said system. Forming part of the steering apparatus is a control valve which can be adjusted so that when the wheels of the vehicle are set for the latter to be driven in a straight line, the valve assumes a neutral position which prevents the flow of working medium so as to prevent movement of said wheels.

6 Claims, 5 Drawing Figures

HYDRAULIC CIRCUIT

FIELD OF THE INVENTION

The present invention relates to a hydraulic circuit used in particular on electrically operated trucks, loaders and the like, having electrically operated drive means which are preferably driven by one or more electric batteries or accumulators. Accumulators are normally carried on the vehicle and the electrical energy stored in the accumulators is used, inter alia, for running the vehicle. When the batteries have been emptied of their charge, they are recharged so as to be able to power said vehicle. The vehicle envisaged also has hydraulically operated control means and a hydraulically operated working device, such as lifting device and/or a tipping device for lifting forks and the like.

DESCRIPTION OF THE PRIOR ART

It is known in connection with vehicles having electrically operated drive means to provide a hydraulic control arrangement in which working medium is constantly supplied to said control means by means of a hydraulic pump. This pump is operated continuously, which is disadvantageous, since, among other things, the driver of the vehicle is subjected to a continuous, disturbing noise. With previous constructions, the hydraulic pump serving the control means is separate from the hydraulic pump which is used to activate the working device, for example the aforesaid lifting device or tilting device. Although this latter pump is only operated intermittently, when the working device is being used, it will be readily understood that the noise level of two simultaneously operating pumps is relatively high.

Since the vehicle employs electrically operated drive means and since said means are operated by electric accumulators, the amount of available, stored electric energy is limited. The continuously operating hydraulic pump constantly consumes electrical energy from the batteries, thereby placing a restriction on the total running capacity of the vehicle.

When using conventional hydraulic vehicle steering apparatus on an electrically operated truck, the electric circuit of the pump motor is held closed by means of a pressure switch, which is closed when the driver of the vehicle sits on the driving seat. The pump motor operates continuously as long as the driver remains seated in the driving seat. When the vehicle is driven in a forward direction no steering operation is necessary so consequently no working medium is used for the steering apparatus. Accordingly, the hydraulic oil is not placed under pressure under these conditions. Instead, an overflow valve permits the oil to flow back to the hydraulic oil tank or reservoir. To enable current to be saved when the vehicle is driven in "straight" lines, i.e. other than when desiring to turn the vehicle, a manually operated foot switch has been proposed which can be used for starting and stopping the pump. This expedient has been found unsuitable however, since manipulation of the switch requires great care and diligence on the part of the driver and also constitutes a danger from the aspect of traffic safety.

OBJECT OF THE PRESENT INVENTION

An object of the present invention is to provide ways and means for improving the effective running time of vehicles having electrically operated drive means. This is achieved by arranging for the same electrically operated pump means to supply working medium to the steering apparatus and to the working device or devices. This can be effected by providing the supply lines serving the steering apparatus with a device for accumulating said working medium and means for sensing the pressure in said lines, said pressure sensing means being arranged to co-act with the pump means in a manner such that said pump means is activated at a pre-determined low pressure value and is de-activated at a pre-determined high pressure value. One condition for such an arrangement is that the steering wheel, of the vehicles controlled by the steering apparatus can be adjusted by means of a control valve capable of determining the position of said wheel, and that the control valve is arranged to block the passage of working medium when said valve occupies a neutral position, i.e. when the vehicle steering is adjusted for driving the vehicle in a straight line. The control valve must be capable of taking up hydraulic pressure on its input connection when the vehicle steering wheel is not activated.

As a result of the aforementioned arrangement, the pump means will only be activated for short periods of time, so that the disturbing noise originating from said pump means will only occur for a correspondingly short period of time. The arrangement also contributes in certain cases by 30 - 60%.

SUMMARY OF THE INVENTION

In general, the apparatus of the present invention comprises a hydraulic circuit used in a vehicle having electrically operated drive means, a hydraulically operated steering apparatus and a hydraulically operated working device such as a lifting device, tilting device or the like. The same electrically operated pump means is arranged to supply working medium to said steering apparatus and to said working device. A system of pipes serving said steering apparatus comprises a working medium accumulating device and a device for sensing the pressure in said pipe system, wherein the pressure sensing device is arranged to co-act with the pump means in a manner such that when a pre-determined low pressure value prevails the pump means is activated, while the pump means is de-activated when a pre-determined high pressure value prevails. A control valve for determining the extent to which a steering wheel forming part of the steering apparatus is turned, is arranged to prevent flow of working medium when said valve occupies a neutral position.

A working medium distributing device has at least two electrically operated means. At least one of said means is arranged to cause low pressure in the feeding pipe to said device when the pump device is activated.

BRIEF DESCRIPTION OF THE DRAWINGS

So that the invention will be more readily understood and further features thereof made apparent, a vehicle constructed in accordance with the invention will now be described by way of example only with reference to the accompanying drawings, in which.

Figure 1:
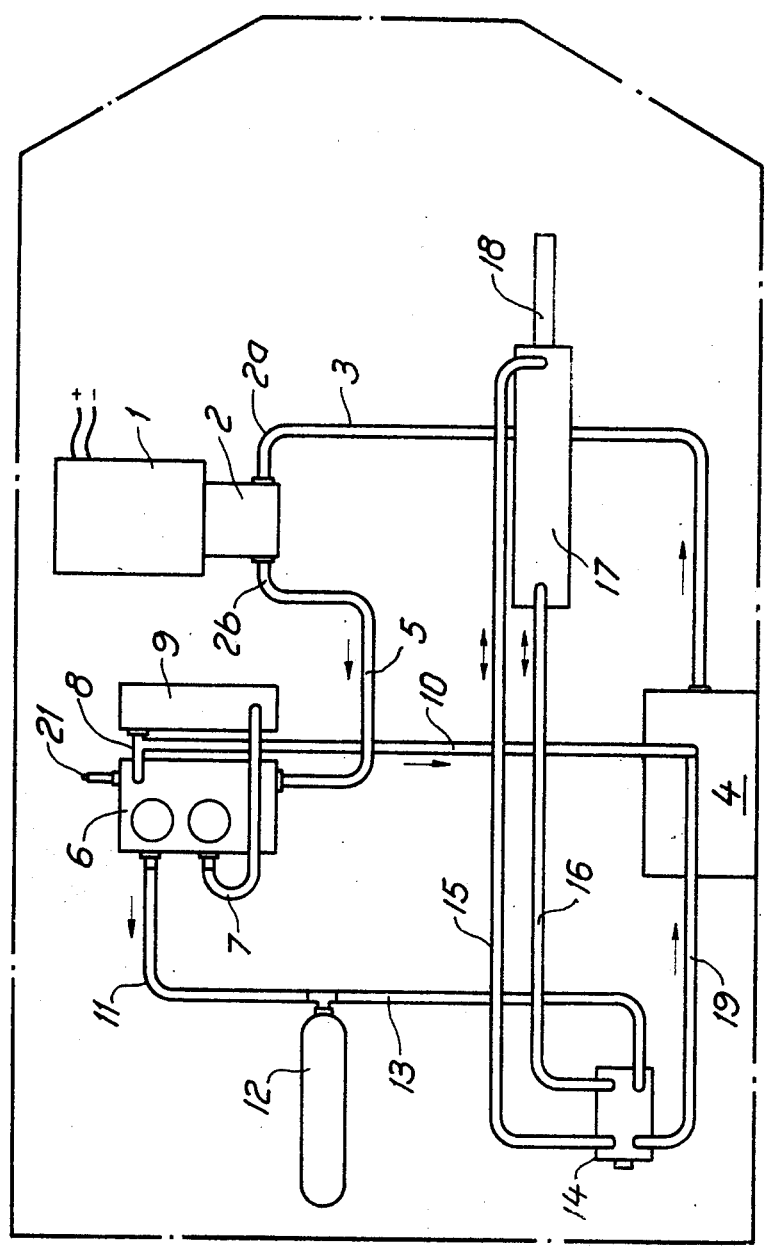
FIG. 1 shows the manner in whch the different vehicle components are connected hydraulically.

DESCRIPTION OF A PREFERRED EMBODIMENT.

As already indicated, the present invention relates to a vehicle, such as a truck, having electrically operated drive means, hydraulically operated control means and a hydraulically operated working device, such as a lifting device, tilting device or the like. Since the invention is not directly concerned with the supply of electric current to the electrically operated drive means or with the arrangement of the electric batteries, these components have been omitted from FIG. 1 for the sake of clarity.

In addition, since the specific construction of the steering apparatus, comprising steering devices, linkages etc., the manner in which the drive means are operated by means of electric accumulators; or the vehicle brakes etc. do not comprise part of the present invention, these components have also been omitted from the drawing.

Although the invention may be used with pneumatically operated devices and with hydraulically operated devices, the invention will be described with reference to an hydraulically operated system.

Referring to FIG. 1 there is shown an electric motor 1 which is arranged to drive a hydraulic pump 2. The input side 2a of pump 2 is connected to a working medium tank or reservoir 4 via a line 3. The output side 2b of the pump is connected, via a line 5, to a working medium distributing device 6. Connected to the distributing device 6 are two lines 7 and 8. Line 7 is connected to a valve 9 which is arranged to conduct working medium through a line (not shown) to a working cylinder (not shown) coacting with the aforementioned working device (also not shown). The line 8 is a return line which extends between and connects the device 6 and the valve 9. The distributing device 6 and the valve 9 are also connected to the tank or reservoir 4 via the line 8, which is connected by a return line 10 to the tank 4. The distributing device 6 is also provided with connection means for a pipe 11 which forms part of a system of pipes serving the steering apparatus. The line 11 is arranged to co-act with a device 12 which accumulates the working medium and which is connected via line 13 with a control valve 14 forming part of the actual steering apparatus. The control valve 14 comprises a valve sold under the trade name "ORBITROL" DSP-180. This valve can be regulated and the extent of vehicle steering wheel movement is determined by the valve. The valve is regulated so that when in a neutral position, i.e. when the wheels are set for the vehicle to be driven in a straight line, the passage of working medium through the valve 14 is blocked. Thus, the distributing device 6 is constructed so that pressure can build up upstream of the valve 14. Lines 15 and 16 extend from the control valve 14 to a control cylinder 17 which forms part of the hydraulic system of the steering apparatus. A piston 18 of the control cylinder 17 is arranged to activate linkages (not shown) for setting the position of the vehicle wheels. A line 19 is connected between the control valve 14 and the tank 4. Oil returned from the control cylinder 17 passes through the valve 14 to the tank 4 via the line 19.

As will be seen from FIG. 1, the same hydraulic pump 2 serves both the steering apparatus and the working device (not shown).

The device 12 for accumulating the working medium is a hydraulic oil accumulator dimensioned to accumulate at least sufficient working medium to permit full extension of the piston 18 and thus turn the vehicle through its maximum angle when the steering wheel of the vehicle is itself turned the full extent of its movement. The hydraulic oil accumulator may also be dimensioned to accumulate working medium in a quantity sufficient to steer the vehicle through its fullest extent at least twice. Further, the pump means 2 is dimensioned to enable it to feed sufficient working medium into the hydraulic oil accumulator 12 in 2 seconds of operating time to fully charge the accumulator to permit at least one complete steering cycle without restarting the pump motor 1. In this way it is ensured that the sound eminating from the motor and the pump is of short duration and that a minimum quantity of electrical energy is used.

The system of pipes had disposed therein a device 21 which is arranged to sense the pressure in said system and which is located within the working medium distributing device 6. Pressure sensing device 21 will be described in more detail below. The device 21 for sensing the pressure in the pipe system 11 and accumulator 12 is arranged so that, when a predetermined low pressure value prevails, the motor 1 is energized and the pump means activated. Similarly when a pre-determined high pressure value prevails in said system 11, 12, the motor 1 is de-energized and the pump means 2 de-activated. To this end, the pressure sensing device 21 is arranged to actuate electric switches placed immediately adjacent the working medium distributing device 6. These switches are of conventional design and have not been shown in the drawings.

Figure 2:
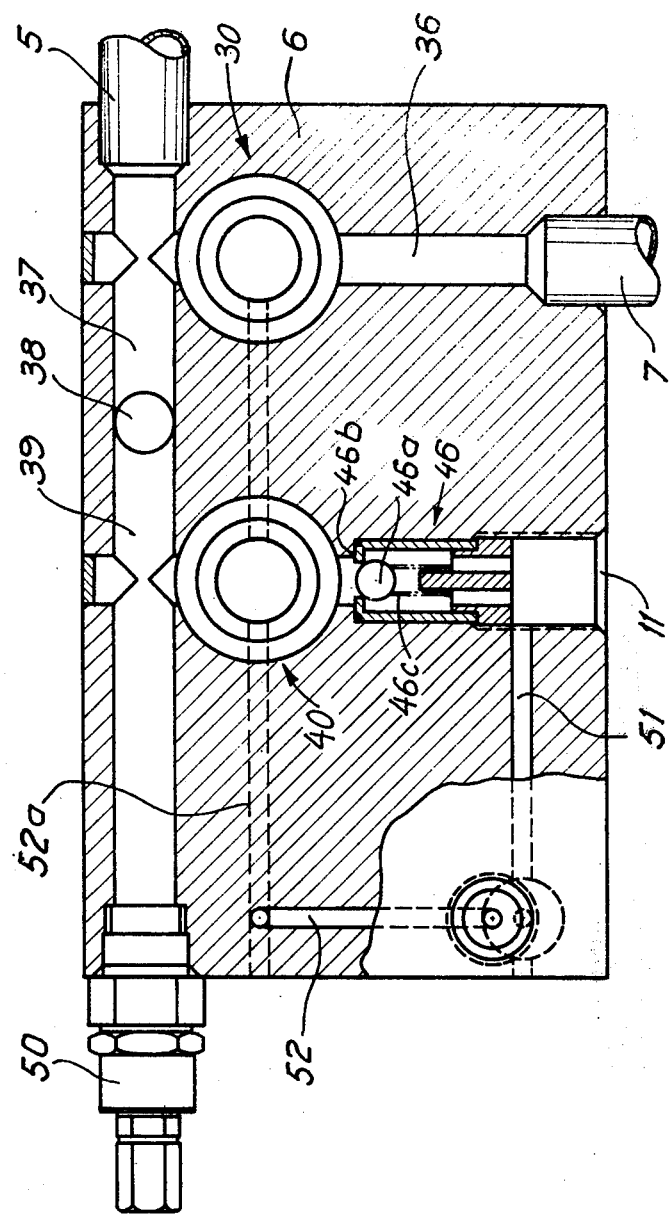
FIG. 2 is a sectional view of a proposed embodiment of a control medium distributing device.
Figure 3:
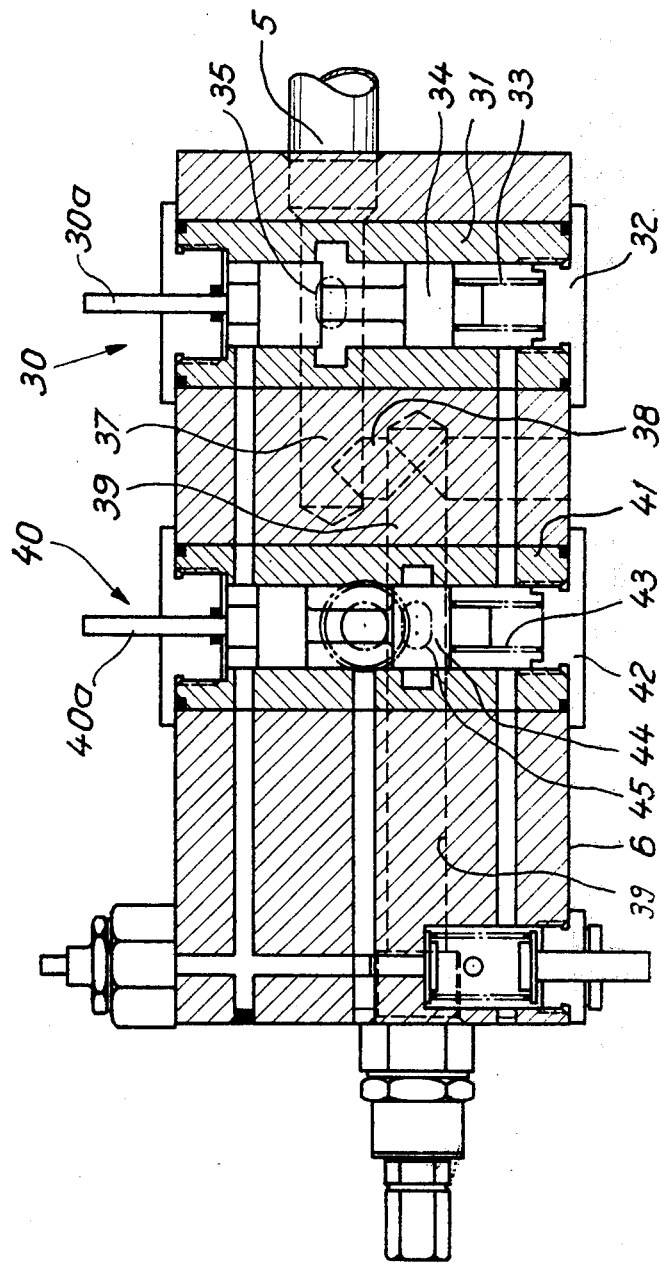
FIG. 3 shows the working medium distribution device of FIG. 2 in a different sectional view.
Figure 4:
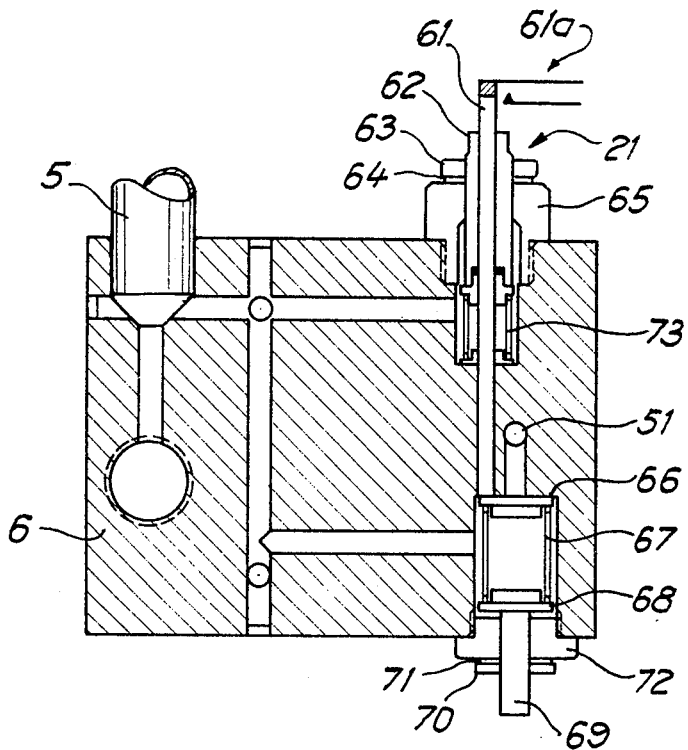
FIG. 4 is a cross sectional view of the working medium distributing device shown in FIGS. 2 and 3 and FIG. 5 shows a wiring diagram for the vehicle steering apparatus and working device of the vehicle.

FIGS. 2 to 4 are different sectional views of the working medium distributing device 6. As will be seen from the drawings, the lines or pipes 5, 7, 8 and 11 are connected to said device. The device 6 is provided with auxiliary means 30 for storing working medium in the pipe system 11, 12, as hereinafter described, and a further means 40 which is arranged to co-act with the aforementioned steering apparatus. The auxiliary means 30 comprises a sleeve 31 in which there is arranged a bottom screw 32 against which a spring 33 located in a recess in the sleeve is arranged to rest. The spring 33 is arranged to hold a piston 34, in a position spaced from the bottom screw 32. The sleeve has a hole 35 which, in the shown position of FIG. 3, connects a passage 36 — which communicates with the pipe 7 — with a passage 37 which communicates with the pipe 5. Thus, oil present in the pipe 5 can pass through the distributing device 6 via the auxiliary means 30 into the pipe 7 and into the valve 9, which in its unactivated position does not utilize the working medium but allows it to pass to the tank 4 via pipe 10.

The pipe 5 is connected to the passage 37 which, via a passage 38, merges with a further passage 39. The passage 39 communicates with the means 40 co-acting with the steering apparatus. Similar to the auxiliary means 30, the means 40 comprises a sleeve 41, the lower portion of which is sealed by means of a bottom screw 42. A spring 43 is arranged to bias a piston 44 away from the bottom screw 42. The sleeve is provided with a hole 45 which in the non-activated state of means 40, as shown in FIG. 3, is blocked by the piston 44. Passage of working medium from the means 30 to the passage connected to the pipe 11, via a check valve 46, is thus prevented.

The check valve 46 is of conventional design and does not form part of the present invention. It can be mentioned, however, that the check valve comprises a ball 46a which is biased against a seat 46b by a spring 46c.

The passage 39 is arranged to communicate with a conventional relief valve 50. Thus, as soon as the pressure in the pipe 5 reaches a pre-determined high pressure value the valve 50 will open, so that said pre-determined value cannot be exceeded. This is purely a safety measure.

A passage 51 extends from the pipe 11 to the pressure sensing device 21 arranged in the pipe system. A further passage 52 extends to a passage 52a which communicates with the means 30 and 40 and serves as a venting device.

The pressure sensing device 21 is shown in more detail in FIG. 4. The device 21 comprises an operating rod 61 which is arranged to co-act with a setting screw 62, which screw in turn co-acts with an operating rod guide means 65, via a lock nut 63 and an intermediate copper washer 64. The pressure prevailing in the pipe system is applied via the passage 51 to a piston 66 and moves the latter downwards against the action of a spring 67 which bears against a spring holder 68. The position of spring holder 68 is adjusted by means of setting screw 69 operating in holder 72. A lock nut 70, bearing against copper washer 71 fixes the position of setting screw 69 in holder 72. The pressure prevailing in the pipe system 11 is arranged to force the piston 66 against the setting screw 69 and, with the aid of spring 73, the rod 61 moves downwardly as seen in FIG. 4. As the pressure in the pipe system 11, 12 decreases the piston 66 will move upwards and therewith force the operating rod 61 upwardly, as shown in FIG. 4.

The working medium distributing device 6 operates in the following manner. As described below in the explanation of the wiring diagram of FIG. 5, when valve 9 is activated to activate the working device, a switch 102 is activated together with the valve, thereby energizing motor 1 and, therewith, pump 2. Closing of switch 102 sets up a series of events, described in detail with respect to FIG. 5, causing working medium to be fed to the device 6 via the pipe 5. The piston 34 remains in the position shown in the drawing and the hole 35 is located immediately adjacent the passage 36, whereby working medium will pass out through the pipe 7 to the valve 9 and out through the pipes 8 and 10. The result of the activation of valve 9, however, causes a part of (or the whole of) the working medium to pass to the valve 9 to activate the same. The hydraulic pump 2 remains activated as long as the valve 9 is activated.

If it is assumed that the steering apparatus is used to such an extent that the pressure in the pipe system 11, 12 falls to the pre-determined low value, the operating rod 61 will be moved to its uppermost position and will activate a switch 61a, which is diagrammatically shown in FIG. 4 and which is arranged to activate the hydraulic pump 2 by energizing the electrical conductors passing to the motor 1. It should be noted here that the means 30 and 40 can be activated by activation of respective electromagnets alotted to each of said means. These magnets are not shown in FIG. 3, but are arranged, upon activation, to co-act with the rods 30a and 40a to force the rods downwards. It is important that when starting up the hydraulic pump 2 the pipe 5 is not under pressure, since pressure in the pipe 5 gives rise to considerable sparking in the commutator of the motor. To prevent the occurrence of pressure in the pipe 5, said pipe is normally connected with the return pipe 10 to the tank 4 via passages 37, 36, pipe 7, valve 9 and pipe 8. The pressure sensing device 21 is constructed so that it can regulate the pre-determined low and high pressure values, said pressure values lying respectively within the ranges 20 – 40 kp/cm$^2$ and 120 – 70 kp/cm$^2$.

When activating the pump 2 as a result of low pressure in the pipe system 11, 12, the electromagnets (not shown) which activate means 30, 40 are simultaneously energized, so that the pistons 34 and 44, are moved downwardly as seen in FIG. 3 against the bottom screws 32, 42. The piston 34 closes the communication of pipe 5 with passage 36 and, in this position, the working medium will flow through passages 37, 38, 39, since the piston 44 in means 40 is moved downwardly, as seen in FIG. 3, to effect communication through the check valve 46 with passage 11. The working medium passes into the pipe system 11, 12 until the rod 61 and piston 66 are moved to their lowermost position, whereupon the operating rod 61 inhibits activation of the hydraulic pump 2 by breaking the current circuit with the motor 1 via switches 61a. If in the above described position, the valve 9 is activated, the current to the coils of the magnet activating means 30 is broken, and the piston 34 takes its upper position. In this way working medium is allowed to flow from passage 5 to the pipe 7, thereby enabling the working device to be operated.

Figure 5:
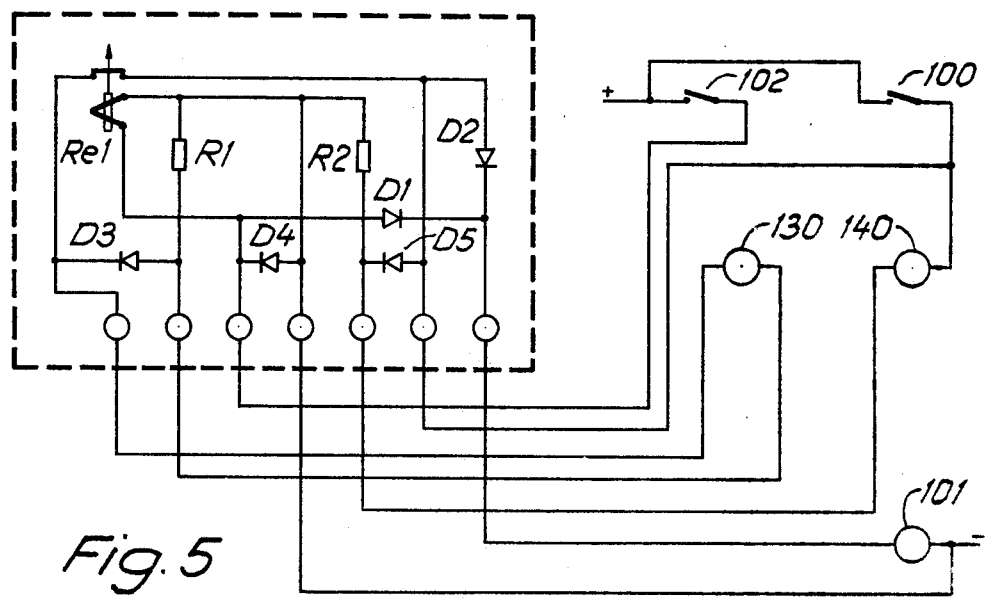

FIG. 5 shows suggested wiring diagram of the components forming part of the invention.

When the rod 61 takes its lower position, the contacts 61a of a microswitch 100 (FIG. 5) are activated, whereupon current is allowed to pass to the electromagnet 140 for means 40 and through a diode D2 of a switch 101 for the motor 1, and through a relay RE1 of an electromagnet 130 for means 30. If, in the aforementioned case, the valve 9 is activated, a microswitch 102 is also activated, which switch activates the relay RE1 and breaks the current to the electromagnet 130. If the operating rod 61 has taken its upper position and the microswitch 100 breaks the current but the valve 9 is activated, and therewith also the microswitch 102, the current passes through the diode D1 to activate the switches 101 for the motor 1. The relay coil of the relay RE1 is also activated in this case, although this activation is of no significance. The diodes D3, D4, D5 serve to protect the other electrical components of the vehicle against disturbances in the form of induced voltages in the electromagnets 130 and 140 and the relay RE1. These protective diodes, however, are only necessary with thyristor operated for driving the vehicle in a forward direction means. The components, the relay RE1, the resistors R1, R2 and diodes D1, D2, D3, D4, D5 are placed in a component box intended therefor.

The invention is not restricted to the described embodiment, but can be modified within the scope of the accompanying claims.

What is claimed is:
1. In a vehicle having electrically operated drive means, a hydraulically operated steering apparatus, a hydraulically operated working device and a reservoir for a hydraulic working medium, said vehicle having a hydraulic circuit wherein the same electrically operated pump means is arranged to supply working medium to said steering apparatus and to said working device, said hydraulic circuit comprising a hydraulic working medium distributing means, a system of pipes connecting said steering apparatus to said distributing means, a working medium accumulating device, means for sensing the pressure in said pipe system, said pressure sensing means being arranged to co-act with the pump means in a manner such that when a pre-determined low pressure value prevails in the system, the pump means is activated, said pump means being deactivated when a pre-determined high pressure value prevails, a steering control valve connected to a steering wheel forming part of the steering apparatus of said vehicle and to a hydraulic cylinder for fixing the extent to which said vehicle is turned, said control valve being arranged to prevent flow of working medium when said valve occupies a neutral position, and at least two electrically operated means for directing flow of working medium through said working medium distributing device connected to said working medium distributing device, at least one of said electrically operated means being in a normally closed position to prevent flow of working medium but arranged to open and cause low pressure in the feeding pipe connecting said pump means to said distributing means when the pump means is activated.

2. A vehicle according to claim 1 wherein the hydraulic working medium accumulating device is provided between said working medium distributing means and said steering control valve, said accumulating device being of sufficient capacity to accumulate working medium in a quantity effective to permit at least one full turn of the steering wheel.

3. A vehicle according to claim 2, wherein the pump means is dimensioned to feed for a period of two seconds said sufficient quantity of working medium into the hydraulic working medium accumulator.

4. A vehicle according to claim 1, wherein the low pressure value lies within the range 20–40 kp/cm$^2$ and the high pressure value lies within the range 120–70 kp/cm$^2$, and wherein the pressure sensing device is adapted to operate within said ranges.

5. A vehicle according to claim 1, wherein the low pressure is maintained by the fact that the input line of the working medium distributing device is connected, via a valve, to a return line of the working medium storage tank.

6. A vehicle according to claim 1, wherein one of said electrically operated means on said working medium distributing device is capable of being actuated via switches on a relay.

* * * * *